United States Patent
Carl

[15] 3,664,876
[45] May 23, 1972

[54] BATTERY

[72] Inventor: Heinz Carl, Masenwinkel, Germany

[73] Assignee: Licentia Patent-Verwaltungs-G.m.b.H., Frankfurt, Germany

[22] Filed: May 20, 1970

[21] Appl. No.: 38,920

[30] Foreign Application Priority Data

May 21, 1969 Germany..................P 19 25 861.8

[52] U.S. Cl............................................................136/160
[51] Int. Cl.............................................................H01m 45/00
[58] Field of Search....................................136/86, 159, 160

[56] References Cited

UNITED STATES PATENTS 2,921,111  1/1960  Crowley et al.........................136/160
3,524,769  8/1970  Sturm et al. ...........................136/160
3,522,098  7/1970  Sturm et al............................136/86 R
3,291,889  12/1966  Uline et al.............................136/86 A

*Primary Examiner*—Donald L. Walton
*Attorney*—Spencer & Kaye

[57] ABSTRACT

The cells of an electrochemical battery are connected electrically in series and interconnected serially for the circulation of electrolyte from cell to cell. Check valves of electrically insulating material are provided for breaking the electrolyte paths between the individual cells. In the method, the electrolyte is circulated first through every other cell while the path of electrolyte into and out of intermediate cells is broken. Then electrolyte is circulated through the intermediate cells while the electrolyte paths into and out of the "every other" cells are broken.

4 Claims, 2 Drawing Figures

Inventor:
Heinz Carl

BY *Spencer & Kaye*
ATTORNEYS.

BATTERY

BACKGROUND OF THE INVENTION

The present invention relates to an electrochemical battery, the cells of which are connected electrically in series and also serially with respect to circulation of electrolyte.

It is already known to provide electrochemical batteries with an electrolyte circulatory system. Such a system may include an electrolyte storage vessel, a pump, a heat exchanger, and equipment for removing products of reaction and for adding materials depleted during operation. An example of such a battery is shown in U.S. Pat. No. 3,359,136 issued Dec. 19, 1967, to U. Merten et al. for a "Rechargeable Energy Conversion System". By connecting the cells electrically and also with respect to electrolyte circulation in series, the electrolyte path acts as electrically conducting shunts to connect cell with cell. There arises an electrical current through the electrolyte paths which, in the case of normal consumable-electrode batteries, causes a self-discharge and, in the case of fuel cell batteries, a loss in power. This shunting effect can lead to a destruction of the electrolyte and also to undesired electrode reactions. In order to avoid the disadvantageous effects of such shunting, it is known from the above-named patent to minimize the cross-sectional area of the electrolyte paths between individual cells and to increase the electrolyte path lengths. Such practice indeed increases the electrical resistance of the electrolyte shunts, but it has the side-effect of making it more difficult to cause the electrolyte to flow and pump power must be appropriately increased.

Another example of technology for reducing the losses due to shunting by the electrolyte path is shown in "Chemi-Ingenieur-Technik", volume 41, No. 4, 1969, pages 146–154. The technique taught there involves circulating the electrolyte for very short times and spacing the periods of circulation by long rest periods. Such technique is only applicable for small batteries, since it becomes necessary to provide external heat exchangers for larger equipment, in order to obtain proper temperature control.

SUMMARY OF THE INVENTION

An object of the present invention, therefore, is to provide improved means for eliminating the disadvantageous effects caused by electrolyte shunting in the prior art.

Another object of the present invention is to hold the current caused by electrolyte shunting so small that, even over long periods, no destruction of cells and/or electrodes occurs.

Yet another object of the present invention is to eliminate that portion of fuel consumption in fuel cells which is attributable to electrolyte shunting.

Another object of the invention is to eliminate the above-described disadvantages of electrolyte shunting, while at the same time providing an electrolyte circulatory system simple in construction and using one and the same electrolyte for circulation through all cells of a battery.

These as well as other objects which will become apparent in the discussion that follows are achieved, according to the present invention, by forming the electrolyte circulatory system in such a way that the electrical conductivity of the electrolyte path between cells is interrupted.

DESCRIPTION OF THE PREFERRED EMBODIMENTS

Figure 1:
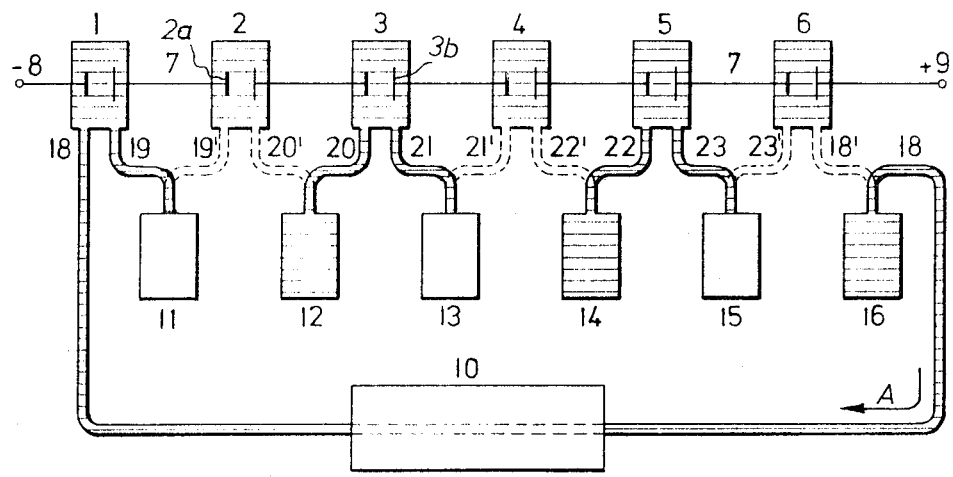
FIG. 1 is a schematic view of a battery according to the present invention.

Referring to FIG. 1 of the drawing, the battery is assumed to have 6 cells numbered consecutively 1–6. These cells are connected electrically in series using copper lines 7. Connections 8 and 9 provide points at which an external load may be attached to the battery. The auxiliary equipment for the electrolyte circulatory system, such as electrolyte storage vessel, pump, heat exchanger, etc., are indicated schematically with box 10 since detailed illustration is not essential for a proper understanding of the invention. Such equipment is disclosed in the above-cited U.S. Pat. No. 3,359,136.

Associated with each cell 1–6 is an electrolyte storer 11–16. These storers are connected to the cells by way of control means for controlling the flow of electrolyte into and out of the storers. The presence of electrolyte in FIG. 1 is indicated by horizontal lines drawn within the various receptacles and connecting lines. Besides there being electrolyte in cells 1–6 electrolyte is also present in storers 12, 14 and 16. The direction of electrolyte flow in the circulatory system has been chosen to be clockwise, as indicated by arrow A. Electrolyte-conducting tubes 18–23 provide that electrolyte may flow from storer 16 through cell 1 into storer 11, from storer 12 through cell 3 into storer 13, and from storer 14 through cell 5 into storer 15. In this starting position indicated in FIG. 1, cells 2, 4 and 6 have no electrolyte-path connection into tubes 19/20, 21/22, and 23/18. Therefore, no electrolytic shunting from cell to cell is possible.

In a first step of operation, electrolyte is brought from storers 16, 12, and 14 into cells 1, 3 and 5. The same amount of electrolyte flows from these cells into the storers 11, 13, and 15. The amount of electrolyte in the cells remains unchanged in this process.

In a second step of operation, the storers 11 and 12 are connected with the previously isolated cell 2 through the tube paths indicated by 19' and 20'. In this process, cell 1 now becomes completely separated from the electrolyte circulatory system. Also cells 4 and 6 are connected with storers 13 and 14, and 15 and 16, respectively, through tubes 21' and 22', and 23' and 18' respectively. Cells 3 and 5 become separated from storers 12 and 13, and 14 and 15 respectively. Therefore, cells 1, 3, and 5 are no longer in the electrolyte circuit.

Tubes 18–23 are thus connected to cells 1, 3, and 5 in the first step of operation and, as indicated by the dashed lines and primes, are connected to cells 2, 4, and 6 in the second step of operation.

Since the previously empty storers 11, 13, and 15 are filled during the first step of operation, electrolyte is transported during the second step of operation from these storers 11, 13 and 15 into cells 2, 4, and 6. Also in the second step of operation, electrolyte flows from cells 2, 4, and 6 into the storers emptied in the first step of operation, namely storers 12, 14, and 16. Consequently, the starting position of the battery is again reached, and there follows now a continuous series of the first and second steps of operation as above-described.

As can be seen, the schematically illustrated structure of FIG. 1 continually prevents electrolyte shunting between cells 1–6. Thus, for example, given plate 2a at one potential and plate 3b at a different potential, there is never a continuous path of electrolyte existent between these plates.

Figure 2:
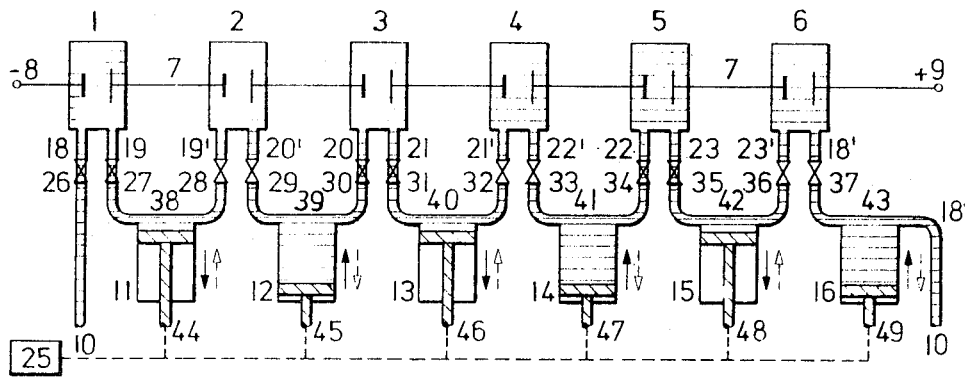
FIG. 2 is a preferred embodiment of the battery of the present invention.

Referring now to FIG. 2, an especially favorable embodiment of the present invention is illustrated.

Storers 11–16 are parts of a multipiston pump system 24 which is driven by a motor 25. Electrically insulating control means 26 to 37 are interposed in the connecting tubes 18–23 and 18'–23' between the cells 1–6 and the storers 11–16. The control means 26–37 can, for example, be provided in the form of check valves.

Each pump 11–16 includes essentially a cylinder 38–43 and an associated piston 44–49. The stroke directions of the pistons 44–49 occurring in the first step of operation are indicated by the solid arrows while the stroke directions occurring in the second step of operation are indicated by the dashed arrows.

The check valve combinations 28/29, 32/33, and 36/37, are closed in the starting position shown in FIG. 2 (at the beginning of the first step of operation), while the valve combinations 26/27, 30/31, 34/35 are open.

In order to electrically interrupt the electrolyte, the check valves 26–37 interposed in the electrolyte-conducting tubes are made of electrically insulating material. A suitable type of check valve is illustrated in FIG. 18–10 (*e* ) appearing on page 419 of "Project Engineering of Process Plants" by Howard F. Rase and M. H. Barrow, John Wiley and Sons, Inc., New York, 1957. In the case of a ball or cone check valve, the movable ball or cone can be made, for example, of quartz glass, while the immovable orifice portion, against which the ball or cone moves to close the valve, can be made, for example, of methylmethacrylate as described on page C–730 of the "Handbook of Chemistry and Physics", The Chemical Rubber Company, Cleveland, Ohio, 49th edition, 1968. Each part of the valve in the above-mentioned FIG. 18–10 *e* must also be insulating. Experiments have shown that when valves of such construction are interposed in an electrolyte circuit, when a resistance of about 25 ohms is measured between two points on either side of the opened valves, a resistance of 25 kiloohms is measured over the same path when the valves are closed. The resulting electrolyte shunt currents occurring when using such valves lie in the area of $1 \times 10^{-6}$ amperes. Destruction of electrolyte and oxidation of electrodes is so small at such current that undisturbed battery operation in terms of years is obtained.

The operation of the embodiment of FIG. 2 will now be described.

In a first step of operation, the pistons 44, 46, and 48 move downwards, while the pistons 45, 47, and 49 move upwards. The check valve pairs 28/29, 32/33, and 36/37 are closed, while the check valve pairs 26/27, 30/31, and 34/35 are open. The pump 11 consequently draws electrolyte from cell 1, while pump 16 acts to move electrolyte through the opened valve 26 into cell 1. The piston 45 of pump 12 moves upwards and the electrolyte present in chamber 39 can only flow through the open valve 30 into cell 3. Cell 2 is electrically separated from pump 11 and from pump 12 because of closed valves 28 and 29, which as described above are electrically insulating. The electrolyte of chamber 39 thus is pumped into cell 3. At the same time, piston 46 of pump 13 moves downwards, and, since the inlet check valve 31 is open, an equal amount of electrolyte flows into the piston chamber 40 of pump 13. Cell 4 is likewise electrically isolated by the closed valves 32 and 33 from the pumps 13 and 14. The quantity of electrolyte present in the chamber 41 of pump 14 can only flow through open valve 34 and into cell 5 when piston 47 moves upwards. At the same time, an equal amount of electrolyte flows out of cell 5 through check valve 35 into the chamber 42 of pump 15 whose piston 48 is undergoing a downward movement. Also, cell 6 is electrically isolated from the electrolyte circuit because of closed valves 36 and 37.

The closed valves, thus those in a state of high electrical resistance, act, therefore, to interrupt the electrical conductivity of the electrolyte, so that the shunting of the cells through electrolyte paths which would otherwise be present is prevented.

During a second step of operation, the check valve pairs which were previously closed, namely 28/29, 32/33, and 36/37, are opened and the valve pairs 26/27, 30/31, and 34/35 are closed. The pistons of the pumps 11–16 now move in the directions given by the dashed arrows, so that the electrolyte present in chambers 38, 40 and 42 is forced into cells 2, 4 and 6 which are now open to the electrolyte. An equal quantity of electrolyte is drawn into the piston chambers 39, 41, and 43 from cells 2, 4 and 6. Since the valve pairs 26/27, 30/31, 34/35 are closed in this second step of operation, the cells 1, 3, and 5 are separated from the electrolyte circuit by the electrically insulating character of the check valves.

With the completion of the second step of operation, there follows another first step of operation with a corresponding change in the check valves and movements of the pistons of the separate pumps, as described above. Then follows again a second step of operation, and so forth. It is naturally to be understood that the labeling of the steps of operation as first and second is not intended to limit the particular step of operation which is used to initiate operation following a period during which the battery of the present invention was shut down.

The electrolyte is thus continuously interrupted during circulation of electrolyte and all cells are nevertheless continuously filled with electrolyte. The circulation of the electrolyte is carried out with respect to groups of cells by appropriate movement of the pistons of the pumps.

While the above-described preferred embodiment uses storers physically separate from the cells, it is within the broader concept of the present invention to, for example, open and close the valves with solenoids and to enlarge the cells themselves to perform the storage function. Electrolyte movement can be by gravity flow.

It will be understood that the above description of the present invention is susceptible to various modifications, changes and adaptions, and the same are intended to be comprehended within the meaning and range of the equivalents of the appended claims.

I claim:

1. In an electrochemical battery having cells connected electrically in series, the improvement comprising: means for connecting said cells serially for the circulating of electrolyte through them; means for breaking the electrolyte path through said connecting means between said cells; storer means associated with each pair of serially neighboring cells for storing electrolyte and, as components of said connecting means, means for communicating each storer means selectively with one of the pair of cells with which it is associated; and means for flowing electrolyte through said communicating means alternately first through every other cell from storer means filled with electrolyte to storer means empty of electrolyte and then through cells intermediate the every other cells from said previously empty storer to said previously filled storer means, in repetition.

2. An arrangement as claimed in claim 1, wherein said storing means and said flowing means comprise pumps, there being one pump interposed between each pair of neighboring cells, said breaking means and said communicating means including electrically insulating control means for interrupting the continuity of electrolyte paths.

3. In an electrochemical battery having cells connected electrically in series, the improvement comprising: means for connecting said cells serially for the circulating of electrolyte through them; means for breaking the electrolyte path through said connecting means between said cells; means for eliminating an electrical path through said connecting means simultaneously with the breaking of the electrolyte path, said connecting means including a tube extending between each set of neighboring cells in the electrical series connection of said cells; a pump including a piston and a chamber for every set of neighboring cells, each tube being divided into two parts, one part leading from a first cell of a set into one end of the chamber of the pump associated with the set, the other part leading from said one end of the chamber into the second cell of the set; said breaking means including an electrically insulating check valve interposed in each of said parts of said tubes, each check valve including means for permitting flow of electrolyte only in one direction, all of said flow permitting means permitting flow in a common direction of electrolyte circulation, the piston of every other pump being at said one end of its chamber when the piston of each pump intermediate the every other pumps is at the other end of its chamber.

4. A method for circulating electrolyte through cells connected electrically in series, comprising the steps of interconnecting the cells in series with respect to electrolyte flow, flowing electrolyte in a predetermined direction through every other cell while at the same time breaking the path of electrolyte into and out of the cells lying intermediate the every-other cells, and then flowing electrolyte in said predetermined direction through said intermediate cells while at the same time breaking the path of electrolyte into and out of said every-other cells.

* * * * *

UNITED STATES PATENT OFFICE
CERTIFICATE OF CORRECTION

Patent No. 3,664,876             Dated May 23rd, 1972

Inventor(s) Heinz Carl

It is certified that error appears in the above-identified patent and that said Letters Patent are hereby corrected as shown below:

In the heading of the patent, change the patentee's residence from "Masenwinkel, Germany" to --Obertshausen, Germany--.

Signed and sealed this 24th day of October 1972.

(SEAL)
Attest:

EDWARD M. FLETCHER, JR.                ROBERT GOTTSCHALK
Attesting Officer                      Commissioner of Patents